United States Patent [19]
Larsson

[11] 3,838,775

[45] Oct. 1, 1974

[54] DEVICE FOR COLLECTING LOOSE MATERIAL FROM A SURFACE, PARTICULARLY OIL FLOATING ON WATER

[76] Inventor: Arne Algot Ragnar Larsson, Auravagen 13, 182 62 Djursholm, Sweden

[22] Filed: Feb. 28, 1972

[21] Appl. No.: 229,845

[30] Foreign Application Priority Data
Mar. 12, 1971   Sweden.............................. 3238/71

[52] U.S. Cl............................ 210/242, 210/DIG. 21
[51] Int. Cl............................................. E02b 15/04
[58] Field of Search............... 210/DIG. 21, 83, 242; 37/43 E, 43 G

[56] References Cited
UNITED STATES PATENTS

| | | | |
|---|---|---|---|
| 2,200,623 | 5/1940 | James................................ | 37/43 E |
| 3,213,552 | 10/1965 | Vanvick.............................. | 37/43 E |
| 3,484,963 | 12/1969 | Heth et al. .......................... | 37/43 E |
| 3,536,199 | 10/1970 | Cornelius............................ | 210/242 |
| 3,608,728 | 9/1971 | Trimble ............................. | 210/242 |
| 3,623,609 | 11/1971 | Ainlay................................ | 210/242 |
| 3,637,080 | 1/1972 | Markel................................. | 210/83 |
| 3,642,140 | 2/1972 | Parker ................................ | 210/242 |
| 3,682,316 | 8/1972 | Oakley................................ | 210/242 |
| 3,695,716 | 10/1972 | Meyer................................. | 37/43 E |

*Primary Examiner*—Theodore A. Granger
*Attorney, Agent, or Firm*—Hill, Gross, Simpson, Van Santen, Steadman, Chiara & Simpson

[57] ABSTRACT

A device for collecting loose material from a surface, especially oil floating on water, such device employing a drum-shaped rotor rotatable in a relatively closed housing which is provided with an elongated intake opening in the lower portion thereof tangentially displaced relative to the lower portion of the rotor and extending in axial direction across the rotor at the leading side thereof, the housing having a discharge duct communicating with the interior thereof and extending in a direction generally tangentially to the rotor and centrally disposed axially with respect thereto, the rotor being provided with blades of helical configuration forming a centrally disposed ring of material-receiving scoop members substantially aligned with the discharge duct, with said blades being arranged to transport material entering the intake opening toward the scoop members and discharged thereby into said duct.

12 Claims, 3 Drawing Figures

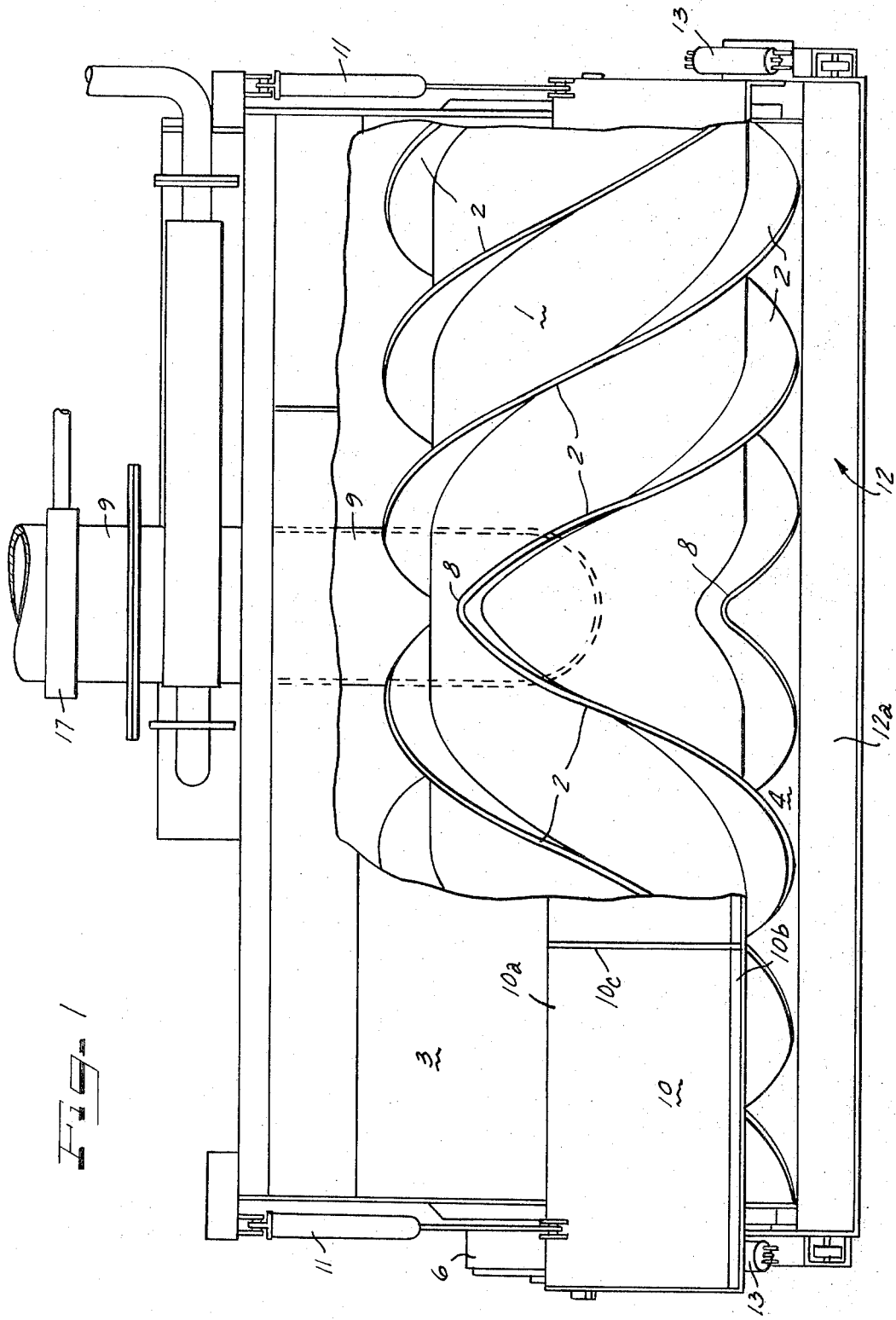

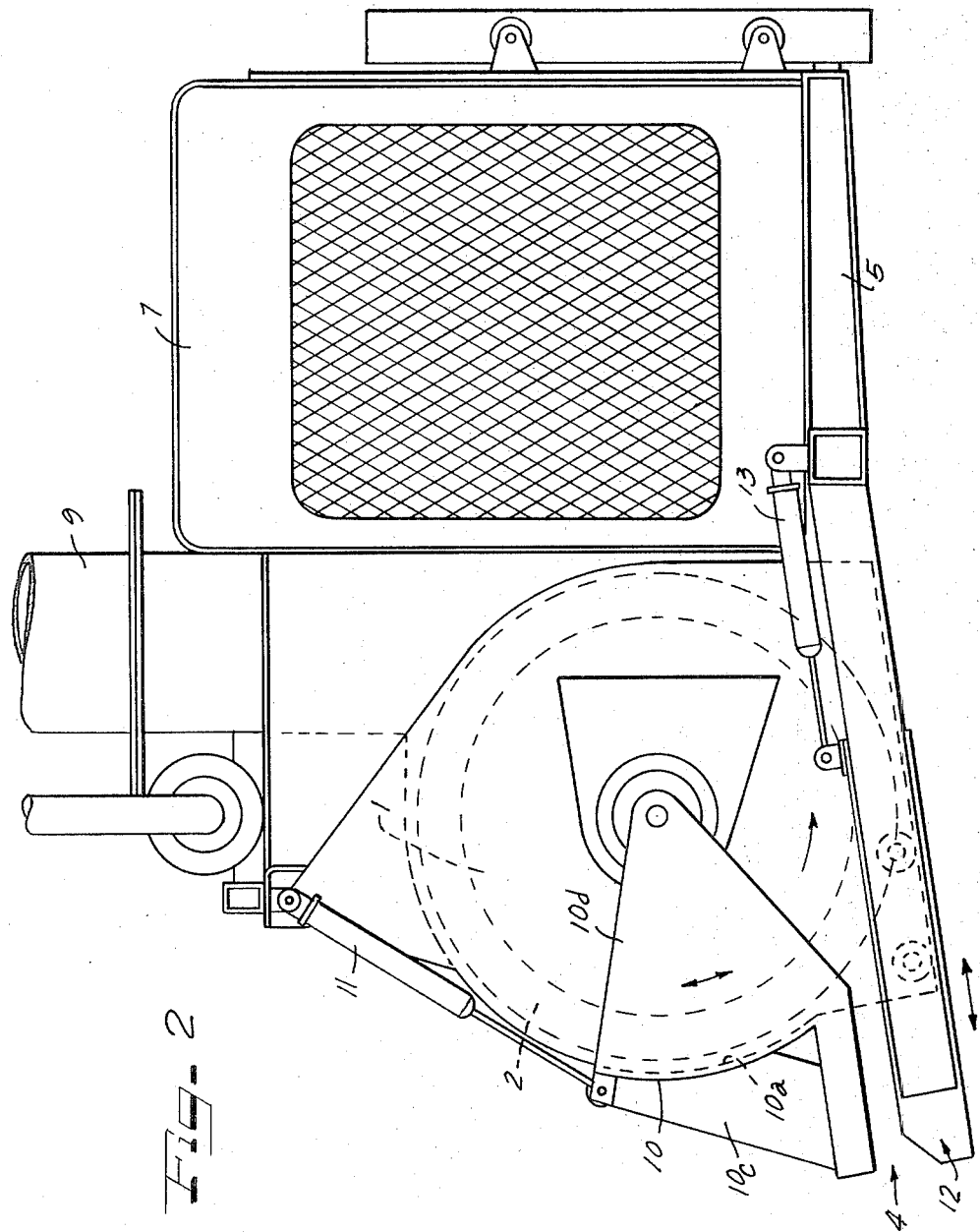

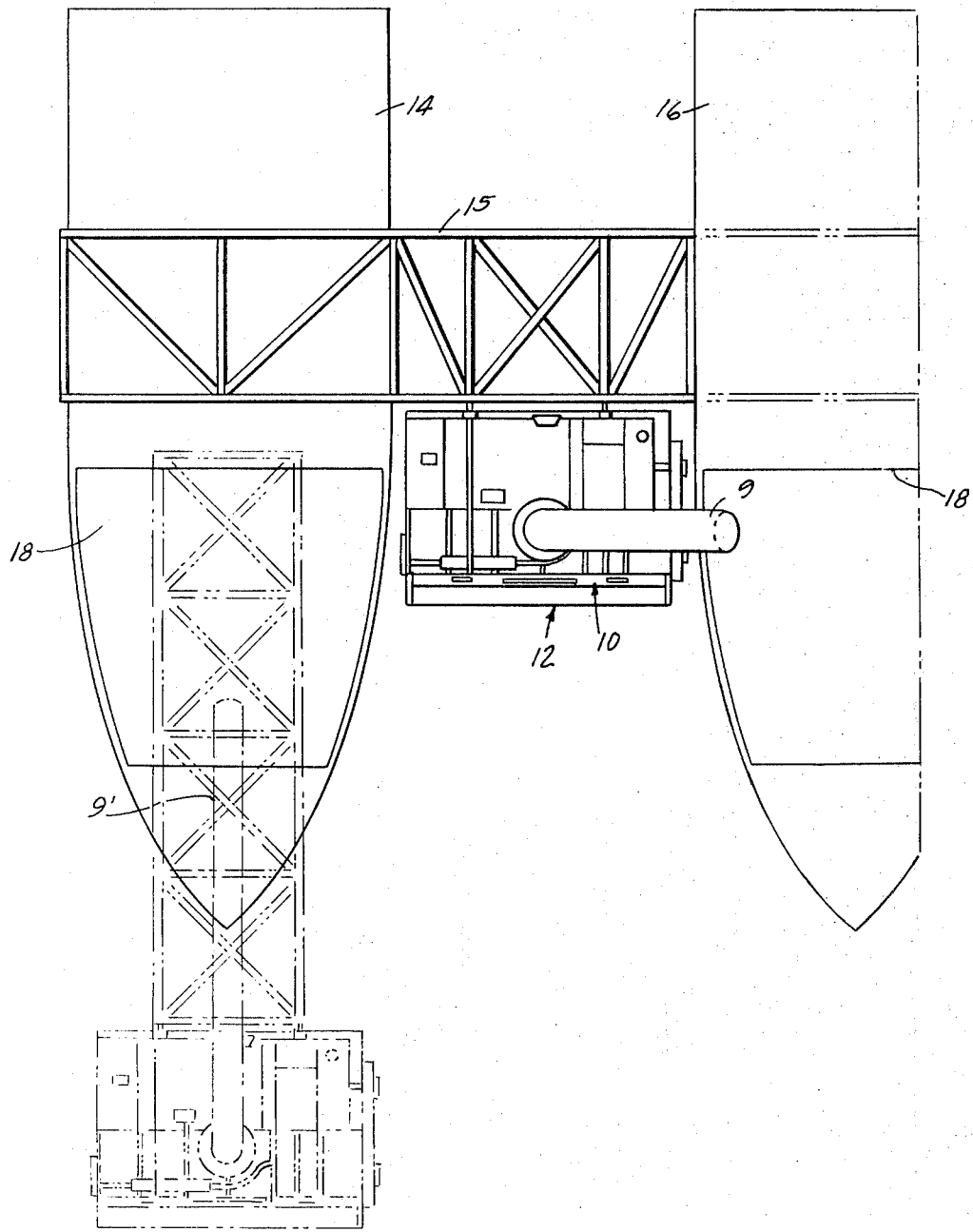

DEVICE FOR COLLECTING LOOSE MATERIAL FROM A SURFACE, PARTICULARLY OIL FLOATING ON WATER

BACKGROUND OF THE INVENTION

The invention is directed to a device for collecting loose material from a surface, especially oil floating on water and is particularly useful for such purposes where viscous oil is involved which is to be removed from a water surface, even where the oil is frozen into or mixed with ice and the like. However, it may also be useful in many cases for other purposes, as for example removing oil from sand beaches, etc., and removing sludge from sedimentation basins and the like.

In the past, various types of equipment have been produced for collecting loose material from a water surface, such apparatus usually taking the form of skimming devices. One example of such type of skimming device, intended for use in collecting oil on water, is illustrated in U.S. Pat. No. 3,219,190. Other known devices for collecting loose material, for example more or less finely crushed ice, also operate in the form of skimming devices. However, for many applications, especially for collecting oil from a water surface, these types of skimming devices have a volume capacity that is far too limited for many applications, as a result of which efforts have been made to find more effective solutions to the problem of collecting oil from a water surface. One such further attempt is illustrated in U.S. Pat. No. 3,314,545 which discloses the use of an inclined conveyor belt which is arranged for partial submersion below the water surface whereby the oil may adhere to the belt as the latter is moved horizontally with respect to such surface. Oil picked up on the belt is then removed therefrom by scrapers disposed adjacent the upper end of the belt. However, while this device may be relatively efficient as to its removal of material from the water surface, its volume capacity likewise is undesirably limited.

It will be appreciated that as one of the very important functions of equipment of this type is in the collection of oil released on a body of water, for example, as a result of shipwreck or the like in which vast quantities of oil can be released in a very short time, severe if not almost irreparable damages may result if the oil is not removed before it reaches land. Consequently, the problem thus presented is not merely a question of how efficient the equipment is, i.e., how much of the oil present in a unit of area is removed by the equipment, but most important, is the equipment capable of taking up large volumes of oil per unit of operational time?

BRIEF SUMMARY OF THE INVENTION

The present invention therefore has as its objective the development and provision of a device having both high efficiency in the degree to which material such as oil is removed and also a suitably high volume capacity, at the same time resulting in a structure which is reasonably easy to transport and handle, and which does not involve prohibitive initial and operating costs.

The method according to this invention of collecting material such as oil floating on water, broadly comprises the steps of drawing a mixture of the oil and any attendant water associated therewith into a chamber, rapidly agitating the mixture therein to convert at least a portion of such mixture into an emulsion, and simultaneously discharging all of the received material from the chamber, preferably also injecting additional water into the material subsequent to its discharge from the chamber to provide a lubricating effect and promote the discharge flow.

The present invention employs a construction somewhat generally resembling a rotary snowplow, which might be expected from the fact that there is some similarity in the general end results. However, the present invention is directed to the production of a device which is especially efficient for the specific purposes intended and thus embodies features of particular use primarily for the specific purposes involved.

The device illustrated in the drawings, which represents a preferred embodiment of the invention, utilizes a rotor which is rotatable on a horizontal axis and disposed within a housing which substantially completely encloses the rotor structure, with the housing being more or less complementally shaped to the generally cylindrical configuration of the rotor. The latter is rotatably supported in the housing for rotation about a substantially horizontal axis and thus parallel to the surface of the water from which the material is to be collected, such material being adapted to be received in a horizontally extending intake opening extending generally parallel to the rotor axis and formed in the lower portion of the housing at the leading side thereof with such opening being so arranged that it may be disposed at or adjacent to the water surface for receipt of material therein. The housing is also provided with a discharge duct which is so located with respect to blades carried by the rotor, which are provided with a novel helical configuration, that material entering the intake opening is transported, and in effect "scooped up" and discharged in the duct provided therefor.

The device, described above may be suitably supported on a carrier or the like, particularly for adjustment in a vertical direction relative thereto in which the details of the carrier will to a large extent depend upon the particular application to which the device is to be put. Thus, where the device is intended for use in collecting oil from a water surface, it may be conveniently mounted on one or more floatable members such as a pontoon, barge or other surface vessel. Where mounted on two suitably spaced vessels, a suitable supporting structure may be provided, extending between the two vessels and the device supported thereby for engagement with the water surface extending between such vessels. It will be appreciated that in such cases, the particular vessels may be so designed that the configuration thereof at the sides adjacent the device will tend to concentrate and direct the floating material toward the device for collection thereby. In other cases, where intended for land use, it may be mounted on suitably adjustable arms carried by a tractor or other land vehicle, and in any of its uses, there may be associated therewith suitable facilities for collection and transportation of the collected material, as for example where a body of water is involved, a separate tank barge or the like may be positioned adjacent the supporting vessel or vessels and in the case of land operations a suitable tanker truck or other vehicle may be employed.

BRIEF DESCRIPTION OF THE DRAWINGS

In the drawings wherein like reference characters indicate like or corresponding parts:

FIG. 1 is a front elevational view of a device constructed in accordance with the present invention, with portions of the housing thereof being broken away to disclose the details of construction;

FIG. 2 is a side elevational view of the structure illustrated in FIG. 1, as viewed from the right thereof; and FIG. 3 is a plan view illustrating how the device may be mounted on one or two barges or other vessels.

DETAILED DESCRIPTION OF A PREFERRED EMBODIMENT OF THE INVENTION

Referring to the drawings, the embodiment of the invention illustrated comprises a drum-shaped rotor 1 having a cylindrical configuration with an imperforate cylindrical sidewall. Rigidly mounted on the rotor are a plurality of radially outwardly extending blades 2 of helical configuration. The rotor is suitably supported in a housing 3 in closely spaced relation with respect to the sidewalls thereof, for rotation about a horizontal axis as viewed in FIG. 1. The housing 3 is provided with a horizontally extending intake opening 4, illustrated as being in the form of an elongated relatively narrow slit having a length substantially coextensive with that of the rotor and extending in a direction parallel to the axis thereof. The housing 3 is adapted to be suitably mounted and supported on a frame 5 with the axis of the rotor and thus the intake slit 4 being adapted to be disposed substantially parallel to the surface from which the oil or other loose material is to be collected, and transverse to the direction of operation of the device with respect to such surface. The rotor is adapted to be driven through a transmission 6 operatively connecting it to a power source 7 which, for example may comprise an internal combustion engine which is illustrated as being mounted on the frame 5 adjacent to but rearwardly of the housing 3.

As will be apparent from a reference to FIG. 1, each of the helical blades 2 mounted on the rotor comprise two oppositely disposed portions, the helical configuration or pitch of which extends in opposite directions whereby the central portions of each blade converge adjacent the central portion of the drum forming respective scoop members or thrower shovels 8 which thus are arranged in a ring-like configuration at the central portion of the rotor, with the helical portions at the axially opposite sides thereof having righthanded and lefthanded pitch. Consequently, as the rotor structure rotates in a counterclockwise direction, as indicated by the arrow in FIG. 2, material, entering the housing through the intake opening 4, is transported circumferentially in the direction of rotation and simultaneously therewith axially from both ends of the rotor toward the central portion thereof and the scoop members 8 whereby the latter discharge the material upwardly into a discharge duct or tube 9 which is disposed adjacent the ring of scoop members 8 and extends upwardly substantially tangential to the periphery of the rotor. The material is then transported through an extension of the duct 9, or other suitable conduit connected therewith, to a suitable collection receptacle or tank, FIG. 3 illustrating a partial extension of the duct 9.

The diameter and speed of rotation of the rotor as well as the number, height and pitch of the blades 2 and scoop members 8 formed thereby may be varied to provide the most efficient operation, depending at least in part on the nature of the particular material which is to be collected. I have found, however, that it is highly desirable, in any case, that the rotor 1 be rotated at a fairly high speed whereby a suction is produced at the intake opening or slit 4. Consequently, the size, and in particular the height or vertical width of the slit 4 should be such that optimum operational results are achieved in dependence upon the material and conditions involved in the collection operation.

Consequently, to insure optimum operating conditions, preferably the portions of the housing defining the upper and lower edges of the intake openings should be adjustable to permit a simple, rapid and dependable adjustment of the intake opening.

In the embodiment illustrated the upper portion of the housing directly above the intake opening is in the form of an independently movable member 10, of a visor-like configuration, having a front wall 10a extending generally concentrically with the rotor drum 1, terminating in a generally outwardly directed lip portion 10b suitably reinforced by a plurality of laterally spaced upwardly extending reinforcing members 10c, only one of which is illustrated in FIG. 1. The visor structure is provided with respective radially extending portions 10d at each end of the structure which are supported at their inner ends from the structure for pivotal movement about the axis of rotation of the drum 1, whereby the upper edge of the intake opening may be vertically raised or lowered by corresponding pivotal movement of the visor structure. Suitable means for effecting such adjustment is provided, which in the embodiment illustrated comprises a pair of double acting hydraulic cylinders 11, whereby adjustment of the visor structure may be readily effected by control of fluid to the cylinders, and the selected adjustment maintained thereby.

The lower edge of the intake opening 4 is defined by a more or less plate-like structure, indicated generally by the numeral 12 having a plate member 12a which defines the lower edge of the intake opening, and as will be apparent from the figures, extends forwardly and downwardly, lying substantially in a plane tangential to the outer edges of the blades 2, and suitably supported for adjusting movement in its own plane, whereby the effective length of such structure and thus the relationship of the forward edge thereof may be varied with respect to the upper edge defined by the visor structure 10. The structure 12 likewise may be readily adjusted and maintained in adjusted position by suitable means, as for example a pair of double acting hydraulic cylinders 13 disposed at each end of the structure 12. It will be appreciated that the adjustable structures may be provided with suitable bearings, guide rollers, etc., in accordance with good manufacturing practice. In addition to the adjustment of the visor structure 10 and plate structure 12, normally the entire device will be vertically adjustable relative to its supporting structure whereby the entire device and the intake opening thereof may be readily adjusted in dependence on the conditions of each particular application, as for example the nature of the oil or material to be collected and the nature, for example the roughness, of the surface form which collection is to be made.

As the invention is primarily directed to the collection of oil and the like from a large water surface, FIG. 3 illustrates preferred forms of mounting to enable efficient collection in such application. Referring to FIG.

3, the reference numeral 14 designates a suitable floatable member or carrier such as a barge or pontoon which carries a frame 15 from which the device is adapted to be supported with the intake opening disposed at the surface of the water. The floatable member 14 may, for example, be self-propelled or may be moved through the water by other means. In the arrangement described, the device is disposed at one side of the supporting vessel, but if deemed desirable or necessary, the device could be positioned ahead of the member 14 with the frame 15 thus projecting forwardly over the bow thereof, as illustrated in broken lines.

In some cases it may be desirable to employ two vessels or carriers, for example an additional vessel 16, designated in broken lines, which may be of like or different construction to the vessel 14. The frame 16 thus extends between and is supported therefrom at its respective ends, with the intake opening of the collection device thus extending substantially between the two vessels. If such vessels are provided with pointed bows, such as illustrated in FIG. 3, the vessels thus tend to form deflecting means operable to deflect or guide the floating material toward and into the collection device.

The material collected may be accumulated in any suitable receptacle for example carried by either or both floatable members 14 and 16, or carried by other suitable means. FIG. 3 illustrates the provision of receptacle means 18 on each of the members 14 and 16, with partial extension of the duct 9 discharging into the receptacle 17 of the member 16, and with an additional extension 9' being illustrated with respect to the forwardly mounted structure, illustrated in broken lines in FIG. 3, and carried by the floatable member 14.

It will be appreciated from the above disclosure that in operation the device according to the invention may be retained in a stationary position, as for example where oil is streaming in a concentrated path from a wrecked ship, or can be moved horizontally along the water surface across an area of water covered by a layer of oil or the like. The oil and inevitably also some water is drawn through the intake opening 4 under the influence of the suction produced by the rotor drum 1 and transported inwardly in the passages between the blades 2 toward the scoop members 8. The blades 2 and the scoop members 8 thus tend to beat the oil and water into an emulsion which is then thrown upwardly through the discharge duct 9.

In some cases, particularly, for example, where an especially heavy and viscous oil is involved, the discharge duct 9 may be provided with one or more rings of suitable nozzles, generally indicated in FIG. 1 by the reference numeral 17, through which water or other suitable fluid, for example, water and steam, is injected into the discharge duct 9 operative to form a peripherally extending lubricating layer along the sidewall of the duct between the latter and the transported oil, etc.

The present invention has proved in actual practice, to possess highly desirable operational characteristics. For example, an embodiment of the invention having a total weight to 2,500 kgs and employing a rotor length of about 2.5 meters, driven by a 170 hp diesel engine was readily capable of collecting up to 12 to 15 cubic meters per minute of heavy oil mixed with ice and water, when driven at a drum speed of approximately 375 rpm. It will be appreciated that this capacity is considerably larger by several times that of previous devices for the same general purpose. Also, of importance is the advantage of the present invention that the device is capable of handling materials which contain amounts of solids, such as small pieces of ice, driftwood, etc.

It will also be appreciated from the above description that the details of construction may vary considerably within the scope of invention, particularly in adaptation thereof to specific materials to be collected and the nature of the surface from which collection is to be made.

Having thus described my invention it will be apparent that various immaterial modifications in the same may be made without departing from the spirit and scope of my invention.

What I claim:

1. A device for collecting a mass of material floating on water, particularly oil, comprising a cylindrical rotor rotatable about an axis adapted to extend substantially parallel to the general surface from which such material is to be collected, said rotor drum having a plurality of generally radially extending blades of helical configuration, with the portions of each blade disposed at opposite sides of the axially central portion of the rotor drum having opposite pitch to form respective right and left-handed portions, each pair of which are connected at their inner ends forming a central ring of material-receiving scoop members, a housing substantially enclosing said rotor and constructed to define an elongated, narrow slit therein extending in axial direction across the rotor drum at the leading side thereof, and tangentially displaced relative to the lowermost portion of said rotor in leading direction, which slit forms a material intake opening, said housing having a material discharge duct communicating with the housing interior, which duct extends in a direction generally tangential to said rotor and axially disposed substantially in alignment with the scoop members at the central portions of said rotor blades, said rotor being rotatable in a direction to move the lower portion thereof away from said intake opening, and said blades being so arranged that material entering said intake opening is tangentially transported toward said scoop members and thereby discharged therefrom into said discharge duct, float means for supporting said housing above the surface of a body of water with said material intake opening disposed to receive material floating upon such surface, float-supported receptacle means for collected material, and conduit means operatively connected to said discharge duct, adapted to discharge collected material into said receptacle means.

2. A device according to claim 1, wherein the portion of the housing defining the upper edge of said intake opening is upwardly movable to effect a generally vertical adjustment of said upper edge and thereby vary the effective size of said intake opening, and means for retaining said portion in any of its adjusted positions, relative to the remainder of the housing.

3. A device according to claim 1, wherein the portion of said housing defining the lower edge of said intake opening is adjustable toward and away from the lower portion of the rotor in a direction which is tangential to the lower portion of the latter, to vary the position of the lower edge of said intake opening with respect to the upper edge thereof and with respect to the rotor, and means for retaining said portion in any of its adjusted positions relative to the remainder of the housing.

4. A device according to claim 1, wherein the portion of the housing defining the upper edge of said intake opening is upwardly movable to effect a generally vertical adjustment of said upper edge and thereby vary the effective size of said intake opening, and the portion of said housing defining the lower edge of said intake opening is adjustable toward and away from the lower portion of the rotor in a direction which is tangential to the lower portion of the latter, to vary the position of the lower edge of said intake opening with respect to the upper edge thereof and with respect to the rotor, and respective means for retaining each of said portions in any of its adjusted positions relative to the remainder of the housing.

5. A device according to claim 4, wherein said first mentioned portion defining the upper edge of the intake opening is of visor-like configuration and is mounted on said housing for pivotal movement about the axis of said rotor.

6. A device according to claim 5, wherein said means for maintaining the respective portions, defining the upper and lower edges of said intake opening, in their adjusted positions comprises respective hydraulic cylinder means.

7. A device according to claim 1, comprising means associated with said discharge duct for introducing a fluid thereinto to provide a lubrication layer between the inner surface of the duct sidewall and the material being transported therein.

8. A device according to claim 4, wherein said float means for supporting said housing over the surface of a body of water comprises at least one floatable member of a size and shape to maintain said housing and associated structure in operative position at the water surface, and including means connecting said device to such supporting means.

9. A device according to claim 8, wherein a single floatable member is employed, with said connecting means being operable to dispose said housing at the water surface adjacent the floatable member.

10. A device according to claim 8, wherein a pair of floatable members are employed, disposed in laterally spaced relation, with said connecting means extending between and supported at its ends by the respective floatable members, said housing being supported thereby at the water surface between the two floatable members.

11. A device according to claim 9, wherein said floatable member carries said receptacle means.

12. A device according to claim 10, wherein at least one of said floatable members is provided with such receptacle means.

* * * * *